United States Patent [19]
Schaffer

[11] Patent Number: 5,203,415
[45] Date of Patent: Apr. 20, 1993

[54] PROCESS FOR BONDING TO THE SIDEWALL OF A HORSE'S HOOF

[76] Inventor: Allan B. Schaffer, 4751 Del Moreno Dr., Woodland Hills, Calif. 91364

[21] Appl. No.: 855,852

[22] Filed: Mar. 20, 1992

[51] Int. Cl.$^5$ ............................ A01L 3/02; A01L 5/00
[52] U.S. Cl. ............................................. 168/4; 168/17
[58] Field of Search .................. 168/4, 17, DIG. 1; 606/212

[56] References Cited

U.S. PATENT DOCUMENTS

| | | | |
|---|---|---|---|
| 144,833 | 11/1873 | Cooke | 168/17 |
| 3,283,825 | 11/1966 | Ward | 168/4 X |
| 3,302,723 | 2/1967 | Renkenberger et al. | 168/4 |
| 3,921,721 | 11/1975 | George | 168/17 X |

OTHER PUBLICATIONS

Jacques Jenny et al., "Hoof Repair With Plastics," *J.A.V.M.A.*, vol. 147 (1965), 1340–1345.

*Primary Examiner*—Robert P. Swiatek

[57] ABSTRACT

A process for gluing a horseshoe having a rim extending upward around the sidewall of the hoof. In an earlier process, both the hoof and the part to be attached, if any, were preheated to about 275° F. and then bonded with a hard paste-type urethane adhesive. Principal new features are grooving of the sidewall to increase bond strength and lowering the sidewall preheat temperature to 220° F. in order to eliminate the discomfort sometimes experienced at 275° F. by horses with thin sidewalls.

4 Claims, 1 Drawing Sheet

PROCESS FOR BONDING TO THE SIDEWALL OF A HORSE'S HOOF

BACKGROUND OF THE INVENTION

1. Technical Field

The present invention extends the process in my previous patent U.S. Pat. No. 5,069,289 to the additional case of gluing a non-metallic horseshoe having a member(s) such as a rim that extends up the sidewall of the hoof for gluing thereto.

2. Related Art

A side extension such as a rim, or tabs, extending up the sidewall of the hoof is common with glue-on horseshoes. The leading commercially available glue-on horseshoe in the U.S. at present by Mustad, Inc. (patent pending) has side such tabs, as does the commercial version of Tovim's U.S. Pat. No. 4,346,762. For bonding the tabs to the sidewall, both use a cyanoacrylate adhesive, which is not gap-filling.

My referenced earlier patent titled "Process for Gluing to a Horse's Hoof" discloses a process for producing gap-filling durable bonds. That process involves heating both the hoof and an attachable object (e.g. shoe) to a temperature of approximately 275° F. prior to bonding with a gap-filing paste-type urethane adhesive having a hardness in excess of about 50 Shore D. At a temperature of 275° F. a polyurethane horseshoe is highly flexible so that a standard shape can be readily fit to individual hoof contours, particularly when used with a gap-filling adhesive. A high temperature like 275° F. also reduces the cure time for the adhesive and promotes sterilization of the hoof.

However my earlier patent did not specifically address gluing a shoe part to a hoof sidewall. Gluing to a sidewall presents special problems, principally because bonds there can be subjected to very high tensile forces when a horse pivots, and bonds are usually weakest in tension. In addition, for horses with thin hoof sidewalls, such as many thoroughbreds have, when gluing side extensions at 275° F., the high heat can produce discomfort for the horse.

SUMMARY OF THE INVENTION

This invention extends the process of my antecedent patent to cover sidewall bonding of upward extensions on non-metallic horseshoes. A series of close-spaced shallow grooves are cut in the sidewall area of the hoof that is to receive adhesive. When the gap-filling adhesive enters these grooves, a much stronger bond is achieved than would have occurred if the bonding were only to the plain hoof sidewall. Also the hoof is preheated to only about 220° F., as opposed to the 275° F. specified in the antecedent patent, thereby substantially eliminating the discomfort sometimes experienced at the higher temperature by horses with thin hoof sidewalls.

DESCRIPTION OF THE PREFERRED EMBODIMENT

This invention extends my earlier patent to cover gluing of a rim, or tabs, to the hoof sidewall. The principal modifications to the previous process are grooving the hoof and lowering its preheat temperature. Other aspects of the process such as the type of adhesive and the preheat temperature of the shoe are unchanged.

Figure 1:
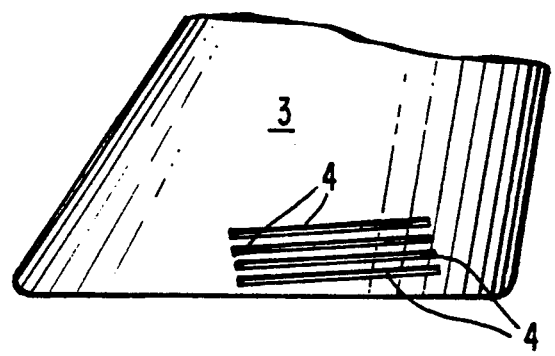
FIG. 1 shows a side view of a hoof with typical grooving of the area that is to receive. adhesive.
Figure 2:
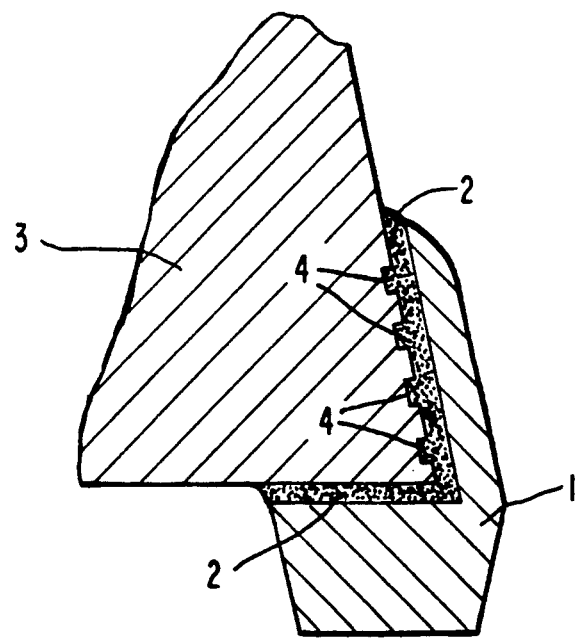
FIG. 2 is a cross-section view of the attached horseshoe showing details of the grooves in the hoof surface.

In FIG. 1 typical grooves 4 have been cut in the sidewall of a hoof 3 prior to attaching the horseshoe. In FIG. 2 the upward extension 1 of the horseshoe, which might be a continuous rim or one of a plurality of tabs, is attached by means of the adhesive 2 to the sidewall of the hoof 3 after grooves 4 have been cut in the sidewall.

The hoof is first cleaned with a solvent. Then the sidewalls are sanded to remove the flaky outer layer. The grooves are cut next. Grooving is usually needed only in the rear portions of the sidewall (from about the quarter rearward), as shown in FIG. 1. The spacing of the grooves is about ⅛" to ¼". The width and depth of the grooves are both about 1/32" to 1/16". The orientation of the grooves is not critical but is usually toward the horizontal, as shown in FIG. 2. Grooves are conveniently cut with a "Dremel" rotary tool equipped with a "Dremel No. 199" cutter.

After grooving, a commercially available surface temperature indicator is applied at several nearby spots and the hoof is heated to about 220° F. with a heat gun. The preferred adhesive, "Duramix 4040" by Polymer Engineering Corporation, is applied to the bottom and side of the hoof, or to the mating parts of the shoe. The shoe, which is flexible because it has been preheated to about 275° F., is placed on the hoof and manually formed to fit the individual contour. The adhesive and shoe are both set sufficiently after about a minute for the horse to stand on the hoof.

The bonds produced with grooving can withstand very high pivoting loads. Such bonds are feasible only with a gap-filling adhesive. The hoof temperature of about 220° F. combined with a shoe temperature of about 275° F. still provides a thermal environment sufficient for very rapid setting of the adhesive. Moreover the hoof temperature of 220° F. is still high enough for substantial sterilization.

The foregoing process can also be applied to the patching of cracks.

I claim:

1. A process for bonding to the sidewall of a horse's hoof a non-metallic part capable of being reversibly preheated to approximately 275° F., wherein prior to bonding with a paste-type urethane adhesive having a hardness in excess of about 50 Shore D, said part is preheated to approximately 275° F. and the area of said hoof sidewall that is to receive adhesive is covered with a plurality of grooves and preheated to a temperature of approximately 220° F.

2. The process of claim 1 wherein the grooves have a spacing of about ⅛ to 174 inch, a width of about 1/32 to 1/16 inch, and a depth of about 1/32 to 1/16 inch.

3. A process for bonding a non-metallic horseshoe with upward extensions for gluing to the sidewall of a horse's hoof, said shoe being capable of reversible preheating to approximately 275° F., wherein prior to bonding with a paste-type urethane adhesive having a hardness in excess of about 50 Shore D, said horseshoe is preheated to approximately 275° F. and the area of said hoof sidewall that is to receive adhesive is covered with a plurality of grooves and preheated to a temperature of approximately 220° F.

4. The process of claim 3 wherein said grooves have a spacing of about ⅛ to ¼ inch, a width of about 1/32 to 1/16 inch, and a depth of about 1/32 to 1/16 inch.

* * * * *